United States Patent
Zumbrunnen et al.

(10) Patent No.: US 12,135,256 B2
(45) Date of Patent: Nov. 5, 2024

(54) PRESSURE MEASURING CELL INCLUDING A PLASTIC MATERIAL FOR A MEMBRANE

(71) Applicant: ReseaTech GMBH, Burgdorf (CH)

(72) Inventors: Simon Zumbrunnen, Oberburg (CH); Philipp Haslebacher, Burgdorf (CH); Jürg De Pietro, Sins (CH)

(73) Assignee: ReseaTech GMBH, Burgdorf (CH)

(*) Notice: Subject to any disclaimer, the term of this patent is extended or adjusted under 35 U.S.C. 154(b) by 375 days.

(21) Appl. No.: 17/680,029

(22) Filed: Feb. 24, 2022

(65) Prior Publication Data

US 2022/0268655 A1    Aug. 25, 2022

(30) Foreign Application Priority Data

Feb. 25, 2021   (CH) .................................. 00200/21

(51) Int. Cl.
*G01L 19/06*     (2006.01)
*G01L 9/06*      (2006.01)

(52) U.S. Cl.
CPC ............ *G01L 19/0645* (2013.01); *G01L 9/06* (2013.01)

(58) Field of Classification Search
None
See application file for complete search history.

(56) References Cited

U.S. PATENT DOCUMENTS

| | | | | |
|---|---|---|---|---|
| 4,141,252 A | * | 2/1979 | Lodge | G01L 9/0072 73/730 |
| 4,926,155 A | * | 5/1990 | Colla | G01L 19/0645 338/42 |
| 5,461,922 A | * | 10/1995 | Koen | G01L 19/0038 73/702 |
| 5,522,267 A | * | 6/1996 | Lewis | G01L 19/141 73/726 |
| 12,013,298 B2 | * | 6/2024 | Jacobsen | G01L 19/0645 |
| 2007/0227252 A1 | * | 10/2007 | Leitko | G01L 9/0079 73/717 |
| 2007/0292071 A1 | * | 12/2007 | Zerwekh | G01L 11/025 385/12 |

\* cited by examiner

*Primary Examiner* — Peter J Macchiarolo
*Assistant Examiner* — Jermaine L Jenkins
(74) *Attorney, Agent, or Firm* — Blank Rome LLP

(57) ABSTRACT

The invention relates to a pressure measuring cell with a base body including an internal space, which base body comprises a first opening. A pressure sensor is arranged in the internal space of the base body and the internal space is filled with a pressure transfer medium. The pressure measuring cell further comprises an uneven membrane made from plastic. The membrane fully covers the first opening of the base body and is metallically coated at least on one of its two sides.

19 Claims, 1 Drawing Sheet

PRESSURE MEASURING CELL INCLUDING A PLASTIC MATERIAL FOR A MEMBRANE

RELATED APPLICATION

This patent application claims priority to Swiss Application No. CH00200/21, filed on Feb. 25, 2021. The entire contents of this application are hereby incorporated by reference.

FIELD OF THE INVENTION

The invention relates to a pressure measuring device, in particular a pressure measuring device for flow sensors with a micro-electromechanical (MEMS) pressure sensor element.

BACKGROUND TO THE INVENTION

Piezo-resistive pressure measurement is based on the principle that the resistance value of the piezo-resistive sensors changes under deformation resulting from pressure effect. This change of resistance is measured to determine the applied pressure and/or the pressure difference.

Piezo-resistive pressure sensors can be produced cost-efficiently and in small manufactured size. They further comprise excellent sensitivity. These favourable properties make piezo-resistive pressure sensors particularly attractive for applications in areas in which small pressure differences are measured, as in, for example, medical/biotechnological areas and in food industries and pharmaceutical industries.

To protect the silicon pressure sensor element of the piezo-resistive pressure sensor from aggressive liquids, this element is customarily encapsulated with an elastic gel, customarily a silicone or a fluorosilicone. This very elastic and soft material generally comprises a good resistance to many hydrocarbons and solvents.

In case the fluorosilicone encapsulation is, however, exposed to strong acids, strong bases or halocarbons, such as for example chlorofluorocarbons and hydrochlorofluorocarbons, also known as Freons, the silicone gel swells up, embrittles and/or dissolves, whereby the measurement result can be distorted, or the pressure sensor element and the underlying electronics can be damaged.

From prior art approaches are known in which the piezo-electric pressure sensor is embedded in a suitable medium and/or housing. The medium and/or the housing protect the silicone-encapsulated pressure sensor element from corrosive, aggressive or reactive substances. These protective materials, however, also effectuate that the pressure is not directly applied to the pressure sensor but is transmitted by means of movable or elastic layers and/or barriers to the pressure sensor. This is problematic since the sensitivity or susceptibility of the pressure measuring device is reduced by a reduced or inefficient pressure transmission of the pressure of the media onto the filling medium of the pressure measuring cell.

A loss of sensitivity of the measuring cell of a MEMS pressure and flow gauge which is to be suited for measuring small pressure differences constitutes a severe problem.

In particular for pressure measuring cells with small dimension known protective layers from metal lead, due to their high inherent stiffness, to a reduced or inefficient pressure transmission. Thus, the minimum size of such metallic pressure measuring cells is limited.

SUMMARY OF THE INVENTION

It is one aim of this invention to mitigate deficiencies of the prior art and to find a pressure measuring cell which is enduring and can sensitively measure pressures and pressure changes. The pressure measuring cell is to be in particular suited for MEMS pressure sensors, and in particular not detrimentally affect the measurement sensitivity of the pressure sensor elements.

Preferably, the pressure measuring cell is to be media resistant and shall comprise good chemical resistance to aggressive and corrosive substances.

The pressure measuring cell shall further preferably be suited for medical engineering and/or bioengineering applications, and for applications in the area of food.

According to the invention, these aims are reached by independent claims 1 and 15, and by their dependent claims.

Specifically, these aims are reached by a pressure measuring cell with a base body including an internal space, which base body comprises a first opening. A pressure sensor is arranged in the internal space of the base body, wherein the internal space is filled with a pressure transfer medium which can be a liquid, a gelatinous or an oily substance or a hardened elastomer. The pressure measuring cell further comprises a membrane, made of plastic, with an uneven form. The membrane fully covers the first opening of the base body and is on at least one side metallically coated.

The uneven form of the membrane contributes to an improved sensitivity of the pressure measuring cell. In comparison to a flat membrane the uneven membrane reacts quicker and in a more sensitive manner to pressure differences.

The membrane is termed uneven inasmuch as it is not flat and its two sides or surfaces are uneven. Preferably, the thickness of the membrane is constant. An uneven membrane can, for example, comprise a wave form. Preferably, the waves are arranged concentrically, wherein the centre of the waves in the pressure measuring cell is located in the geometric centre of the first opening. The membrane can, however, also comprise one or more concentrical half-spheres, or also coves or indentations of most different embodiments. Other uneven forms of the membrane are also suitable.

Favourably, this arrangement ensures that the hydrostatic pressure on the exterior of the measuring cell is transmitted without substantial delays or pressure difference to the pressure sensor. This is among others attributable to the flexible plastic material of the membrane and to the uneven, preferably waved or curved form of the membrane.

Further favourable embodiments are provided in the dependent claims.

According to an aspect of the invention the base body comprises a second opening opposite to the first opening so that the internal space is located between the two openings. In this embodiment a covering element, which preferably is a circuit board, fully covers the second opening. The covering element is hermetically attached to the base body.

The covering element can be attached to the base body in a screwed manner. The covering element can, however, also be attached to the base body by means of other fixtures. Preferably, a sealing element, for example a sealing ring, is used to ensure the hermetical barrier of the covering element attached to the base body.

Favourably, the base body includes together with the membrane, respectively the membrane and the covering element, the internal space, which internal space is hermetically closed off from the outside world.

Favourably further, the pressure transfer medium fully fills up the free volume of the internal space, that is that volume which is not used by the pressure sensor or other components of the pressure measuring cell. This enables an efficient transmission of the pressure applied to the membrane onto the pressure sensor.

In an aspect of the invention the pressure sensor is arranged on the side of the covering element facing the internal space. The pressure sensor can, for example, be glued to the covering element or can be fixated in an alternative manner. The pressure sensor, however, need not be fixated to the covering element.

The pressure sensor is electrically connected with the covering element, preferably the circuit board.

In a favoured embodiment the pressure sensor is a MEMS sensor, for example a piezo-resistive pressure sensor. The pressure sensor can, for example, be placed on a glass substrate. The invention is, however, not limited to piezo-resistive pressure sensors. Other MEMS pressure sensors can also be used within the scope of this invention.

The maximum transversal dimension of a MEMS pressure sensor typically stretches from including 0.5 millimetres to 3 millimetres.

In a MEMS embodiment of this invention, the maximum transversal dimension of the internal space of the pressure measuring cell is preferably less than 1 centimetre, for example from 1 to 10 millimetres, preferably from 2 to 5 millimetres.

In this embodiment the maximum transversal dimension of the first opening is less than 6 millimetres, for example 2 to 4 millimetres.

For conventional pressure measuring cells which use membranes made of metal for receiving the pressure force, this small opening size is a fundamental obstacle to the performance of the pressure measuring cell. In particular the dynamics of the measuring cell and the linearity of the pressure transmission, which cannot be ensured with a metallic membrane any longer, are limited. Due to its relative inherent stiffness of the metallic membranes a pressure measuring cell with a metal membrane with diameters of less than 10 millimetres loses sensitivity, dynamics and/or linearity. Metal membranes of less than 7 mm are therefore not suitable for the purpose of pressure transmission in a pressure measuring cell.

This invention uses, however, a plastic material or a plastic composite material for the membrane. Suitable plastics are, for example, polyether ether ketone (PEEK), polyimide, fluorinated plastics, including polytetrafluoroethylene, perfluoroalkoxy-copolymer, or tetrafluoroethylene/hexafluoropropylene-copolymer. Other plastic materials, respectively their composite materials, are also suitable inasmuch as they comprise a Young's modulus E in a suitable range.

A suitable range for Young's modulus E comprises, at 23° Celsius, 0.01 gigapascal to 6 gigapascal. An elasticity of the membrane material in this range ensures that the membrane of a diameter of 6 millimetres or less than 6 millimetres is sufficiently elastic to enable the required sensitivity of the MEMS pressure measuring cell.

Preferably, at 23° C. Young's modulus of the plastic membrane of a thickness between 10 micrometres and 30 micrometres is in a range from 1.5 gigapascal to 2 gigapascal, preferably from 1.7 gigapascal to 1.9 gigapascal.

Due to its resistance and thermostability, and its good biocompatibility, PEEK is a preferred material for the membrane. These properties make PEEK also particularly suited for all elements which comprise a surface facing the medium, as for example the base body.

Favourably, in this invention the sensitivity of the pressure measuring cell is moreover improved through the form of the membrane.

Specifically, the membrane has a waved form, whereby its stiffness is minimised and the membrane thereby reacts more sensitively and faster to pressure changes. Thereby, the sensitivity of the pressure measuring cell is further increased.

Preferably, the membrane is thermically preformed in the wave form before it is inserted into the pressure measuring cell.

Preferably, the thickness of the membrane is less than 50 micrometres, preferably from 10 micrometres to 20 micrometres.

To live up to the requirements of medical, pharmaceutical and biological applications, the membrane and the base body of the pressure measuring cell are preferentially substantially composed of biocompatible materials.

The membrane and the base body are preferentially fabricated from plastic materials, as for example PEEK, or composite materials, which are inert or chemically resistant to corrosive and/or aggressive compounds. Ideally, these materials comprise good resistance to strong acids, strong bases, solvents, and to halocarbons, including hydrofluorocarbons and hydrochlorofluorocarbons.

Since PEEK plastics are well autoclavable, a pressure measuring cell from PEEK materials is also well suited for sterile applications. PEEK plastics are biocompatible, whereby they are particularly suited for medical engineering applications.

In a preferred embodiment the membrane is composed of PEEK or a PEEK composite material. The base body is preferably also fabricated from PEEK of from a PEEK composite material. The non-electrical components of the optional covering element can also be composed of PEEK or a PEEK composite material.

Favourably, the plastic membrane comprises a metallic coating. The metallic coating is used to further improve the chemical resistance of the membrane. The metallic coating in particular offers the advantage that a diffusion through the membrane is nearly completely prevented. Thereby, the pressure transfer medium and the sensor element are protected from aggressive liquids respectively gases which could diffuse through the membrane. This contributes substantially to the durability of the pressure measuring cell.

The coating thickness of the metal coating is preferably from 100 nanometres to 600 nanometres, preferably from 300 nanometres to 500 nanometres. The coating thickness of the coating should be chosen sufficiently thin in order to prevent a stiffening of the membrane.

Different coating methods are known in the prior art and can be used for coating the membrane. In a preferred embodiment the membrane is sputtered with a nickel alloy.

The membrane can be coated on both sides, that is on its inner side facing the internal space and on its outer side facing away from the internal space. The membrane can, however, also only be coated one-sidedly, preferably on its inner side.

It is possible that the membrane is coated before the assembly of the pressure measuring cell. It is, however, also possible that the membrane is coated during fabrication of the pressure measuring cell. In this case, the membrane is preferentially coated on its inner side.

The metallic coating is preferentially a nickel base alloy. For example, the metal coating is a nickel/molybdenum/chromium/iron/tungsten alloy. Other metal coatings, preferentially nickel or chromium coatings, and nickel alloys or chromium-nickel steel can, however, be used as well. Other chemically resistant alloys are also suitable.

The pressure transfer medium is preferentially a gel, for example a silicone gel, specifically a fluorosilicone gel. Further, the pressure transfer medium is not limited to gels. The pressure transfer medium can also be a liquid, an oily substance or a hardened elastomer.

The pressure sensor is preferably connected by means of conductive elements, for example by means of bonding wires, to the covering element, which preferentially is a circuit board.

To simplify the finishing of the pressure measuring cell, it is advantageous if the pressure sensor is attached to the covering element. The pressure sensor can be fixated to the covering element, for example by gluing. The pressure sensor can, however, also be bonded to the covering element. It is also possible that the pressure sensor is not directly fixated on the covering element. It is further possible that the pressure sensor is only in electrical connection with the covering element.

Other attachment means of the pressure sensor are also possible, for example by snapping into a structure of the covering element provided for attachment, or by fixating by means of suitable fixing elements.

The invention moreover relates to a fabrication method of the pressure measuring cell. In this method the waved membrane is positioned in such a way on the base body, preferentially on the inner side of the base body, that the membrane fully covers the first opening of the base body. The membrane is thereafter laser welded along the perimeter of the first opening, respectively in a suitable distance to the perimeter of the first opening, in such a way that the membrane hermetically closes the first opening. In a preferred method the side of the membrane facing the internal space is coated with a metal alloy, preferably a nickel alloy. The coating proceeds preferentially with a «Physical Vapour Deposition» (PVD) method, also known as sputtering.

Preferentially, the membrane is only metallically coated on its side facing the internal space. The membrane can, however, also only be coated on its outer side, or it can also be coated on both sides.

In a further step the internal space of the base body is fully filled with the pressure transfer medium. The covering element to which the pressure sensor is attached, is thereafter preferentially hermetically attached, under underpressure or in vacuum conditions, to the base body in such a way that the pressure sensor extends into the internal space and so that the pressure transfer medium fully fills up the internal space bounded by covering element, base body and membrane.

To enable an oozing out of the volume of the pressure transfer medium displaced by the pressure sensor from the internal space during the attaching of the covering element, the covering element can comprise a small aperture, for example a small bore, through which the displaced pressure transfer medium can escape. The aperture, respectively the bore is closed after attachment of the covering element. The pressure transfer medium is therefore hermetically included in the internal space of the pressure measuring cell.

The herein presented pressure measuring cell is preferentially suited for measuring pressures and/or pressure differences from 0 bar to 10 bar, preferentially from 0 bar to 5 bar. The herein disclosed pressure measuring cell can, for example, be used as pressure measuring device, difference pressure measuring device or as flowmeter.

Due to the small manufactured size of the pressure measuring cell, it is possible in a simple manner to arrange several pressure measuring cells in a serial or planar manner in order to determine local pressures and pressure differences. Thereby, several pressure cells can comprise one joint base body, which comprises several internal spaces for receiving the pressure sensors and the pressure transfer medium and several first openings. A base body which contains several measuring cells can, for example, be fabricated as monobloc.

The pressure measuring cell is among others suited for use as difference-pressure flowmeter for liquids for measuring a volume flow from 0.1 millilitres per minute to 10 litres per minute.

Due to its small size and its performance range, the pressure measuring cell is among others suited for dosing units in the medical and biotechnological field, including sterile applications. Moreover, the pressure measuring cell can be used for analysers, bottling machines and packaging machines.

In a preferred, biocompatible, corrosion resistant and media resistant embodiment the pressure measuring cell is in particular also suited for medical engineering devices and/or medical implants.

BRIEF DESCRIPTION OF DRAWINGS

Exemplary embodiments of the invention are disclosed in the description and illustrated by the drawings in which:

FIG. 2A bis 2D show steps of a fabrication method of the embodiment shown in FIG. 1, wherein FIG. 2A shows inserting of the waved plastic membrane into the base body of the pressure measuring cell.

DETAILED DESCRIPTION OF DRAWINGS

Figure 1:
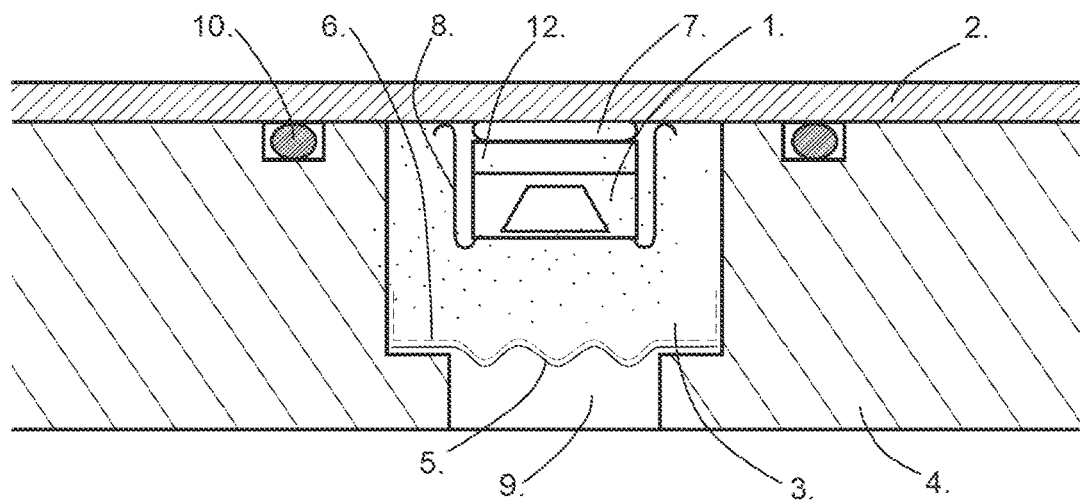
FIG. 1 shows a schematic sectional view of a possible embodiment.
Figure 2A:
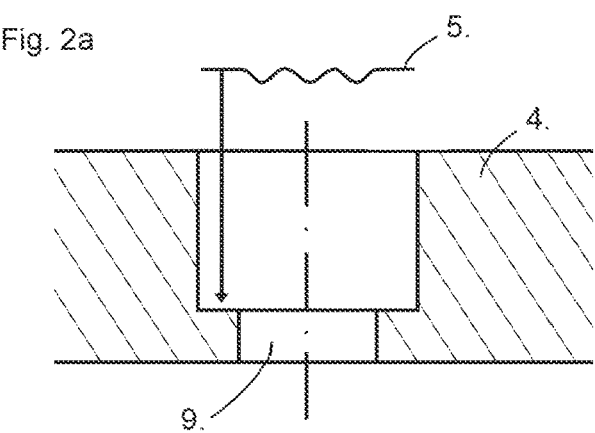
Figure 2B:
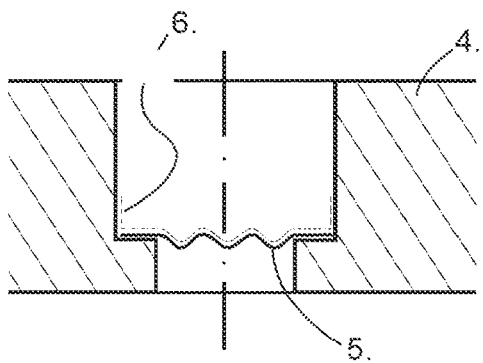
FIG. 2B shows coating of the membrane attached to the inner side of the base body with a metal alloy.
Figure 2C:
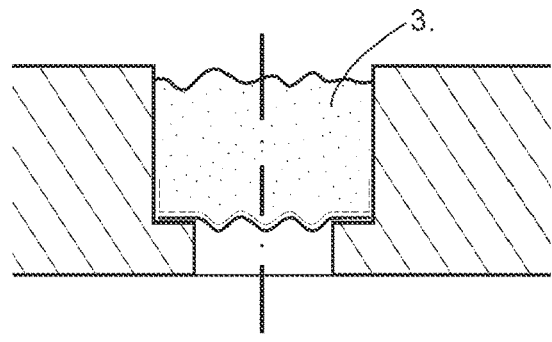
FIG. 2C shows filling up of the internal space with pressure transfer medium.
Figure 2D:
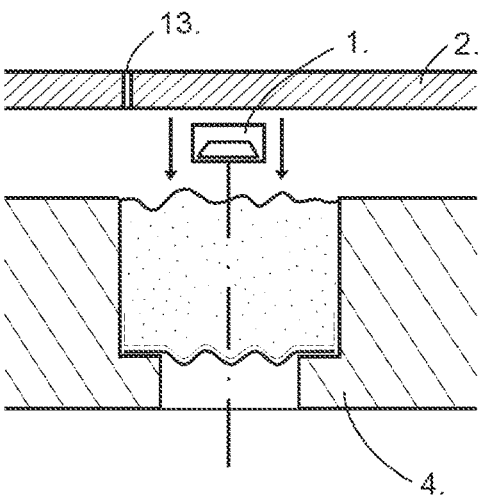
FIG. 2D shows attaching of the covering element with pressure sensor to the base body.

An embodiment according to the invention is shown in FIGS. 1 to 2D and described hereinafter.

FIG. 1 is a schematic sectional view of a possible embodiment of a pressure measuring cell with a base body 4 and a covering element 2. The covering element 2 can be screwed to the base body, wherein a sealing ring 10 is arranged to create a hermetical connection between covering element 2 and base body 4.

In the shown embodiment the covering element 2 is a circuit board. The pressure sensor 1, which is a piezo-resistive MEMS pressure sensor in the shown example, is attached to a glass substrate 12 and by means of the glass substrate 12 fixated to the covering element 2. In this embodiment pressure sensor 1 with glass substrate 12 are fixated by means of a glue 7 to the covering element 2.

The shown pressure sensor 1 is conductively connected via bonding wires 8 to the electronics of the covering element 2, in the current case a circuit board.

The base body includes together with the covering element 2 an internal space into which the pressure sensor 1 extends. The base body comprises on its side opposite to the covering element 2 a first opening 9. This first opening is the measurement opening for the pressure measurement.

The measurement opening 9 is fully covered by a plastic membrane 5. The plastic membrane is attached to the base body 4 around the first opening so that the membrane 5 hermetically closes the opening 9. Preferentially, the membrane 5 is fixated to the base body 4 by means of laser welding.

As shown in FIG. 1, the membrane has a wave form.

In the shown embodiment the membrane 5 comprises on its inner side facing the internal space a metallic coating 6. In this example, the coating is a nickel alloy.

For metallic coating of the membrane 5 commercially available alloys can be used. For example, the alloy can comprise the following elements: nickel up to a maximum of 63 percent by weight, molybdenum 15 percent by weight to 17 percent by weight, chromium 14.5 percent by weight to 16.5 percent by weight, iron 4 percent by weight to 7 percent by weight, tungsten 3 percent by weight to 4.5 percent by weight, cobalt up to a maximum of 2.5 percent by weight, and, optionally, further elements which respectively have a weight percentage part of less than 1 percent by weight. For example, alloys with material numbers 2.4819 or 1.4404 can be used for the coating.

The invention is, however, not limited to these alloys. Other metal coatings, for example made of nickel, or of chromium, or also of nickel and/or alloys comprising chromium can be used as well. Other chemically resistant metals or metal alloys are also suited for the coating.

To enable an efficient pressure transmission from the membrane 5 to the pressure sensor 1, the internal space of the base body is fully filled with a pressure transfer medium 3. In the shown embodiment the pressure transfer medium is a silicone gel. Other pressure transfer media are, however, also suitable, for example oils.

Under the influence of a pressure or in the case of a pressure change, the membrane deforms. In the case of a positive pressure, respectively a positive pressure change the membrane 5 curves in the direction of the internal space.

The direction and the extent of this form change of the membrane is transmitted via the pressure transfer medium to the pressure sensor. The coves, respectively form changes, are admittedly minimal, but since the internal space of the base body is fully filled with substantially incompressible pressure transfer medium, this minimal change leads to a change of the hydrostatic pressure in the internal space of the base body. This changed hydrostatic pressure acts on all surfaces contacting the pressure transfer medium, including the outer surface of the pressure sensor, and thereby the measurement surface of the pressure sensor. In the piezo-resistive pressure sensor the pressure sensor element is thereby deformed, leading to a change in the electric resistance of the measurement bridge arranged on the pressure sensor element. Signal amplification and digitisation and correction of the signal can proceed on the circuit board or also on an ASIC controller added to the pressure sensor element.

In a preferred embodiment the base body 4 is composed of PEEK or a PEEK composite material. Further, the membrane 5 is preferentially of PDDK or a PEEK composite material and its outer side facing away from the internal space is uncoated. The membrane 5 can, however, also be coated on its outer side. The outer surface of the pressure measuring cell is in this preferred embodiment thus made of PEEK or a PEEK composite material.

FIGS. 2a to 2d show in single steps the fabrication of the embodiment shown in FIG. 1.

As shown in FIG. 2a, in a first step the uncoated membrane 5 is inserted into the internal space of the base body 4 and positioned in such a way that its first opening is fully covered. Thereafter, the membrane is laser welded to the base body 4.

In a next step, FIG. 2b, the membrane 5 fixated to the base body 4 is coated with a metal alloy 6. Preferentially, the membrane is coated with the alloy with the PVD method, respectively sputtered.

Thereafter, as shown in FIG. 2c, the internal space of the base body is preferentially fully filled up with the pressure transfer medium 3.

As last step, FIG. 2d, the covering element with the pressure sensor is attached to the base body to hermetically close the filled internal space 3.

To enable an oozing out of the volume of the pressure transfer medium 3 displaced by the pressure sensor 1, the covering element preferentially comprises a small opening 13. This opening is hermetically closed after fixating the covering element, for example by soldering.

It is to be understood that different embodiments and modifications of the herein described, presently preferred embodiments are obvious to the skilled person. Insofar as these embodiments do not diverge from the scope of the claims, it is envisaged that they are also comprised by the herein disclosed invention.

The invention claimed is:

1. Pressure measuring cell comprising
a base body comprising an internal space, said base body having a first opening, wherein the base body comprises a second opening opposite to the first opening, and wherein a covering element is hermetically attached to the base body, so that the covering element fully covers the second opening, and so that the internal space is included by the base body and by the covering element,
a pressure sensor arranged in the internal space of the base body,
a pressure transfer medium arranged in the internal space of the base body, said pressure transfer medium being a liquid, a gel, an oil or a hardened elastomer,
a plastic membrane attached in such a way to the base body that the first opening is fully covered, wherein the membrane comprises an uneven form, and wherein the membrane comprises a metallic coating on at least one side.

2. Pressure measuring cell according to claim 1, wherein the base body (4) is at least partly composed of polyether ether ketone (PEEK) or of a PEEK composite material.

3. Pressure measuring cell according to claim 1, wherein the covering element is a circuit board.

4. Pressure measuring cell according to claim 1, wherein both surfaces of the membrane are uneven and wherein the membrane has a waved form.

5. Pressure measuring cell according to claim 4, wherein the pressure sensor is a piezo-resistive pressure sensor.

6. Pressure measuring cell according to claim 1, wherein the membrane is composed of polyether ether ketone (PEEK) or of a PEEK composite material.

7. Pressure measuring cell according to claim 1, wherein the maximum transversal dimension of the first opening is less than 6 millimetres.

8. Pressure measuring cell according to claim 1, wherein the maximum transversal dimension of the first opening is between 2 millimetres and 4 millimetres.

9. Pressure measuring cell according to claim 1, wherein the uneven membrane is thermically preformed.

10. Pressure measuring cell according to claim 1, wherein the pressure sensor is a piezo-resistive pressure sensor.

11. Pressure measuring cell according to claim 1, wherein both surfaces of the membrane are uneven and wherein the membrane has a waved form with waves arranged concentrically.

12. Pressure measuring cell according to claim 1, wherein the membrane comprises a metallic coating only on its side facing the internal space.

13. Pressure measuring cell according to claim 3, wherein the metallic coating of the membrane comprises a coating thickness of 100 nanometres to 600 nanometres, preferably a coating thickness between 300 nanometres and 500 nanometres.

14. Pressure measuring cell according to claim 4, wherein the membrane comprises a metallic coating only on its side facing the internal space.

15. Pressure measuring cell according to claim 1, wherein the membrane comprises a thickness of less than 50 micrometres.

16. Pressure measuring cell according to claim 1, wherein the membrane comprises a thickness of from 10 micrometres to 20 micrometres.

17. Pressure measuring cell according to claim 1, wherein the membrane is attached to the base body by laser welding.

18. Pressure measuring cell according to claim 1, wherein the pressure sensor is connected to the covering element by means of conductive elements.

19. Method for fabrication of a pressure measuring cell, comprising the following steps:
- positioning of a preformed metal-coated or uncoated membrane at a base body comprising an internal space and a first opening, so that the membrane fully covers the first opening of the base body;
- laser welding the membrane along the perimeter of the first opening, respectively a suitable distance to the perimeter of the first opening, for hermetically attaching the membrane to the base body;
- optionally, if the membrane is uncoated, coating the side of the membrane facing the internal space with a metal alloy;
- attaching a covering element hermetically to the base body, so that the covering element fully covers a second opening opposite to the first opening, and so that the internal space is included by the base body and by the covering element
- filling the internal space of the base body with a pressure transfer medium;
- hermetically fixating a covering element to which a pressure sensor is attached to the base body, so that the pressure sensor extends into the internal space and so that the pressure transfer medium fully fills the internal space delimited by the covering element, the base body and the membrane.

* * * * *